United States Patent [19]

Matsumoto et al.

[11] Patent Number: 5,118,978
[45] Date of Patent: Jun. 2, 1992

[54] ROTOR FOR A GENERATOR

[75] Inventors: Takehiro Matsumoto, Gunma; Kiyohide Satake, Isesaki; Tomihisa Shitara, Gunma, all of Japan

[73] Assignee: Sawafuji Electric Co., Inc., Tokyo, Japan

[21] Appl. No.: 493,389

[22] Filed: Mar. 14, 1990

[30] Foreign Application Priority Data

Mar. 27, 1989 [JP] Japan ................................. 1-74360

[51] Int. Cl.⁵ ................. H02K 21/22; H02K 1/04; H02K 1/22; H02K 7/10
[52] U.S. Cl. ........................... 310/153; 310/43; 310/216; 310/78; 123/149 D; 123/185.2
[58] Field of Search ............. 310/42, 43, 153, 41, 310/216, 217, 218, 264, 78; 123/149 D, 185 A; 74/575, 576, 577 M, 578; 192/103 B, 104 C, 104 B, 105 CD

[56] References Cited

U.S. PATENT DOCUMENTS

| | | | |
|---|---|---|---|
| 3,252,452 | 5/1966 | Burket et al. | 123/185 A |
| 3,570,464 | 3/1971 | Morabit | 123/185 A |
| 3,597,835 | 8/1971 | Scaillet et al. | 310/42 |
| 3,885,177 | 5/1975 | Phelon et al. | 310/153 |
| 4,063,812 | 11/1991 | Mercier | 123/185 A |
| 4,390,804 | 6/1983 | Orova et al. | 310/153 |
| 4,709,669 | 12/1987 | Wissmann et al. | 123/149 D |
| 4,710,659 | 12/1987 | Takano et al. | 310/153 |
| 4,877,986 | 10/1989 | Shimizu | 310/153 |

FOREIGN PATENT DOCUMENTS

3825001  2/1989  Fed. Rep. of Germany ... 123/185 A

Primary Examiner—Steven L. Stephan
Assistant Examiner—C. LaBalle
Attorney, Agent, or Firm—Kanesaka and Takeuchi

[57] ABSTRACT

A rotor for a generator includes a core made of a plurality of magnetic plates laminated with each other, a magnet received in a holding portion of the core, and a synthetic resin mold molded on the core in the circular disc shape. A pawl is rotationally supported on the resin mold by means of a support shaft, and a stopper is formed on the support shaft or the resin mold. The stopper allows the pawl to engage the resin mold but prevents the pawl from disengaging from the resin mold. In case a conical opening is formed, a tapered punch may be pushed into a central opening of the core, so that a conical opening and thickened portion are formed on the core. The core can be directly connected to a crank shaft.

8 Claims, 12 Drawing Sheets

ROTOR FOR A GENERATOR

BACKGROUND OF THE INVENTION

1. Field of the Invention

This invention relates to a rotor of a generator for an internal combustion engine, and a method for manufacturing the same. More particularly, the invention relates to a synthetic resin molded rotor with a core, which is made of a plurality of magnetic steel plates laminated together and is provided with a magnet, and the manufacturing method thereof.

2. Description of Related Art

A recoil starter has been used for cranking or starting a small internal combustion engine. In the recoil starter, an engaging portion of a reel engages a pawl of a rotor for rotating the rotor when a rope wound on the reel is pulled by hand. A crank shaft of the engine is rotated by the rotor to cause cranking or starting the engine, because the rotor is connected to a top end of the crank shaft.

As a result, magnetic flux ejected from a magnet in the rotor interlinks with a generator coil which is immovably fixed to the engine. Therefore, the coil generates electric power, which is used for sparking an ignition plug of the engine, so that the engine is started.

The rotor of the starter, therefore, requires the pawl at the rotor, which transmits rotation of the reel rotated by the rope to the rotor. In this respect, rotation of the rotor should not be transmitted to the reel. Further, when rotational speed of the engine becomes high, the pawl should move to a peripheral side of the rotor by centrifugal force.

In order to accomplish the above mentioned operations or functions of the pawl, the pawl is rotatably supported on a support shaft mounted on the rotor.

In the conventional starter, a support shaft is fitted into a through hole of a rotor and is fixed by an engaging ring. Accordingly, a structure for mounting the pawl is complex, and number of parts and steps for manufacturing the rotor are required.

Also, in a conventional molded rotor, a synthetic resin is molded onto a core made of a plurality of magnetic plates laminated with each other. The laminated magnetic plates should be connected to each other, and also the plates should be connected to a boss of the rotor by rivets. Since the laminated plates should be connected together before molding with resin, it requires some additional manufacturing steps.

Further, in the conventional molded rotor with a laminated core, a metal boss must be connected to the center of the core. A conical opening must be formed at the center of the metal boss for connecting the rotor to a top tapered end of a crank shaft of an engine. Therefore, the boss must be separately formed, which requires additional parts and assembly steps. Also, the metal boss increases weight of the rotor, which contradicts object of lightening the rotor.

In order to solve the above problems, it was tried to form a conical opening directly on the center of the laminated core by lathe. However, this was not successful, because the laminated steel plates becomes disassembled at the center of the core. Further, the rotor could not be firmly connected to the top end of the crank shaft, because the steel plates deform.

OBJECTS AND SUMMARY OF THE INVENTION

It is an object of the invention to solve the above problems brought by the conventional rotor.

Another object of the invention is to provide a rotor, the structure of which is simple and can be easily assembled.

A further object of the invention is to provide a rotor with a pawl which engages stopper means integrally formed on a resin molded rotor for eliminating a separate stopper member, and for simplifying assembling process of the rotor.

A still further object of the invention is to provide a rotor with stopper means integrally formed to be thereon, in which the stopper means is formed deformable so that a pawl can be easily fitted over a support shaft of the rotor to thereby improve assembly process.

A still further object of the invention is to provide a rotor having a through hole with an inclined grooved thereon, which permits a pawl to be assembled without engaging a stopper.

A still further object of the invention is to provide a rotor with a laminated core, wherein a central conical opening of the core can be directly and firmly connected to a tapered top end of a crank shaft to thereby eliminate a center boss or parts and its assembly steps.

A still further object of the invention is to provide a manufacturing method for a rotor with a core made of laminated steel plates connected to each other by means of rivets, wherein the rivet connection is formed by closing metal molds for eliminating separate process for rivetting.

The above and other objects, features and advantages of the invention will be apparent from the following description of illustrative embodiments, which are to be read in connection with accompanying drawings.

According to one aspect of the invention, there is provided a rotor for a generator, wherein a core is made of a plurality of laminated magnetic plates, and a magnet is retained in a holding portion of the core. A synthetic resin mold is formed on the core.

The rotor comprises support means for rotationally supporting a pawl on the rotor, a stopper for engaging the pawl to prevent the pawl from disengaging from the rotor, and means for preventing the pawl from engaging the stopper when the pawl is assembled to the rotor. The pawl can engage a reel, on which a starter rope is wound.

DETAILED DESCRIPTION OF PREFERRED EMBODIMENTS

Figure 1:
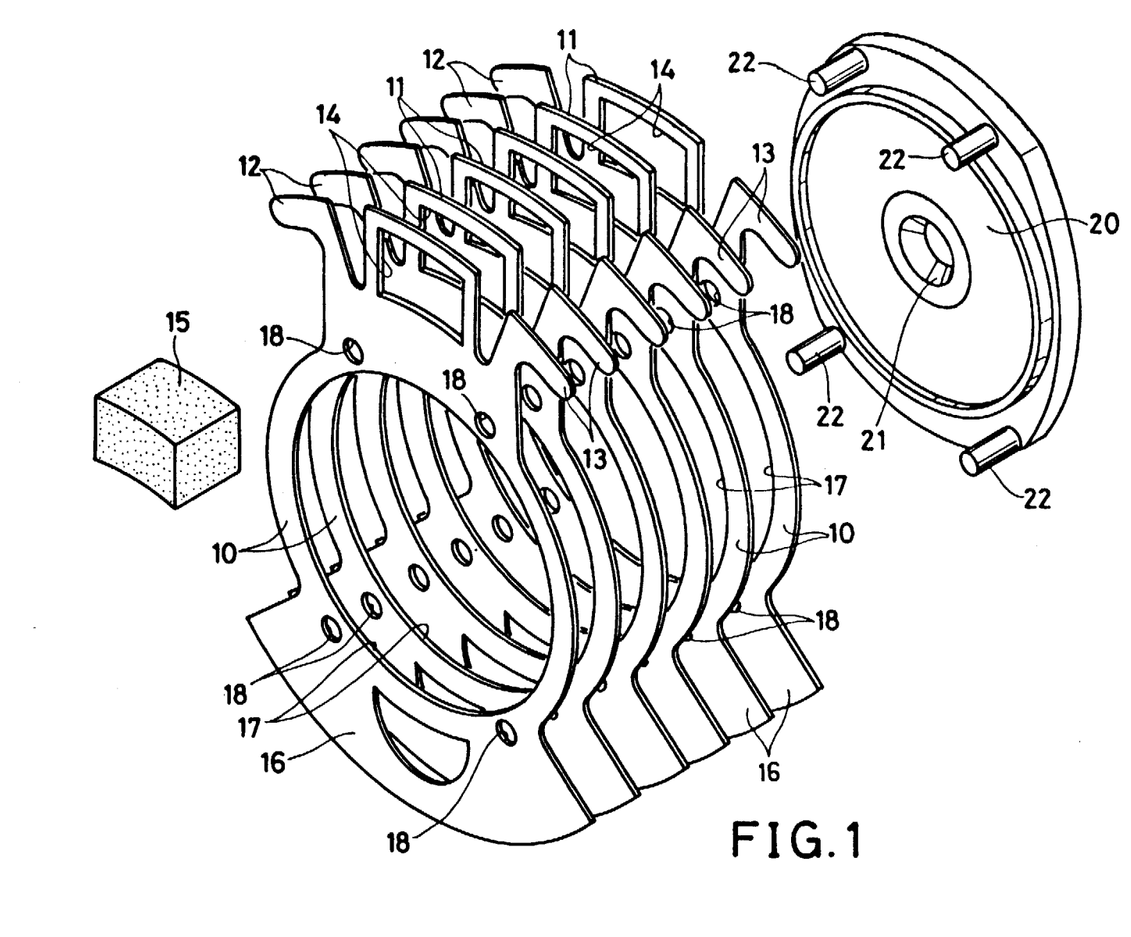
FIG. 1 is an exploded perspective view of a core of a rotor of a generator according to a first embodiment of the invention.
Figure 3:
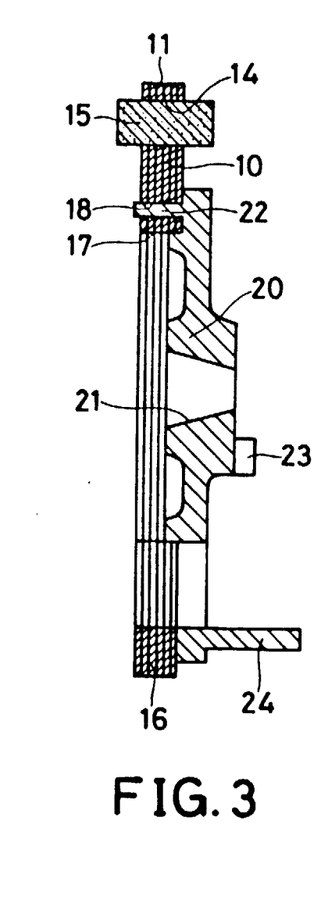
FIG. 3 is a cross section view along the line III—III in FIG. 2.

A rotor core of a first embodiment of the invention is shown in FIG. 1. The rotor core includes a plurality of magnetic steel plates 10 which are laminated together as shown in FIG. 3. Three magnetic poles 11, 12, 13 are integrally formed on the upper side of each plate 10, and a rectangular opening or holding portion 14 is defined at the central magnetic pole 11. A permanent magnet 15 is inserted into and is held in the opening 14. A lower side of the plate 10 constitutes a balance weight 16. Further, a circular opening 17 is formed at the center of the plate 10, and four small openings 18 for receiving rivets are formed around the opening 17.

A boss 20 is formed to be connected to the center of the laminated plates 10. A conical opening 21 is formed at the center of the boss 20, and four rivets 22 are integrally mounted on the boss 20 as shown in FIG. 2 to FIG. 5. The rivets 22 are formed to be fitted into the small opening 18 of the plates 10, and a stopper 23 is formed near the center of the boss 20. Also, a receiving projection 24 is formed at the outer side of the boss 20. These stopper 23 and the projection 24 receive a pawl, which will be described hereinafter.

Figure 2:
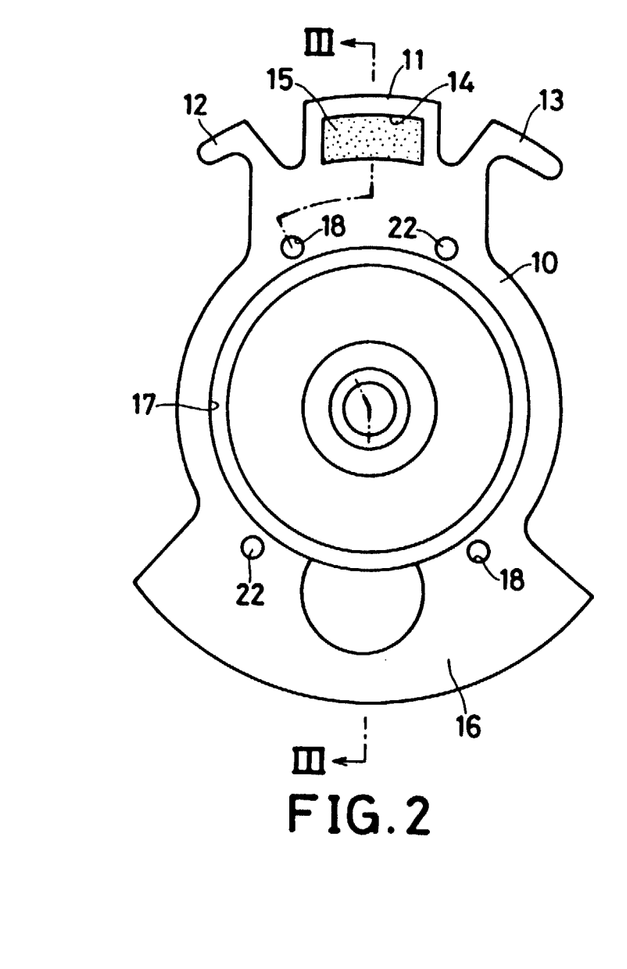
FIG. 2 is a from view of the core shown in FIG. 1.
Figure 4:
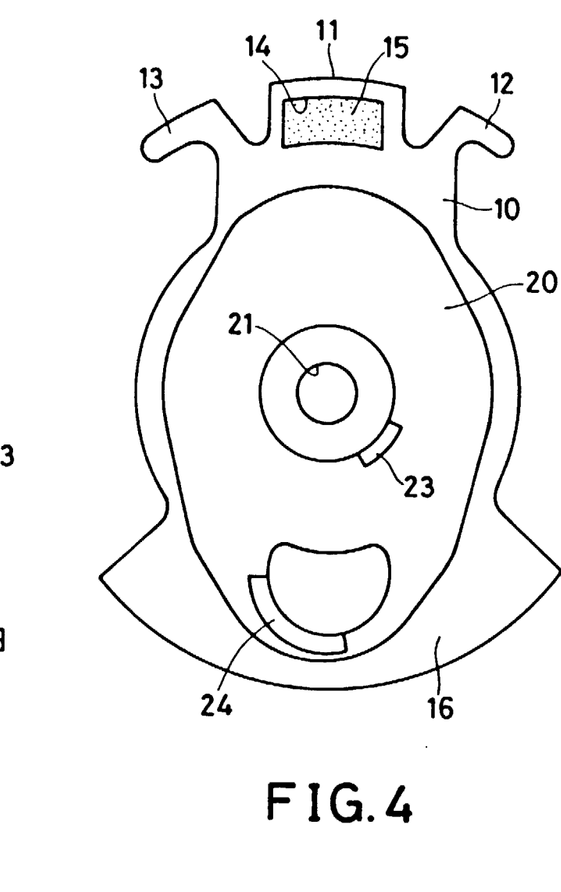
FIG. 4 is a rear view of the core shown in FIG. 2.
Figure 5:
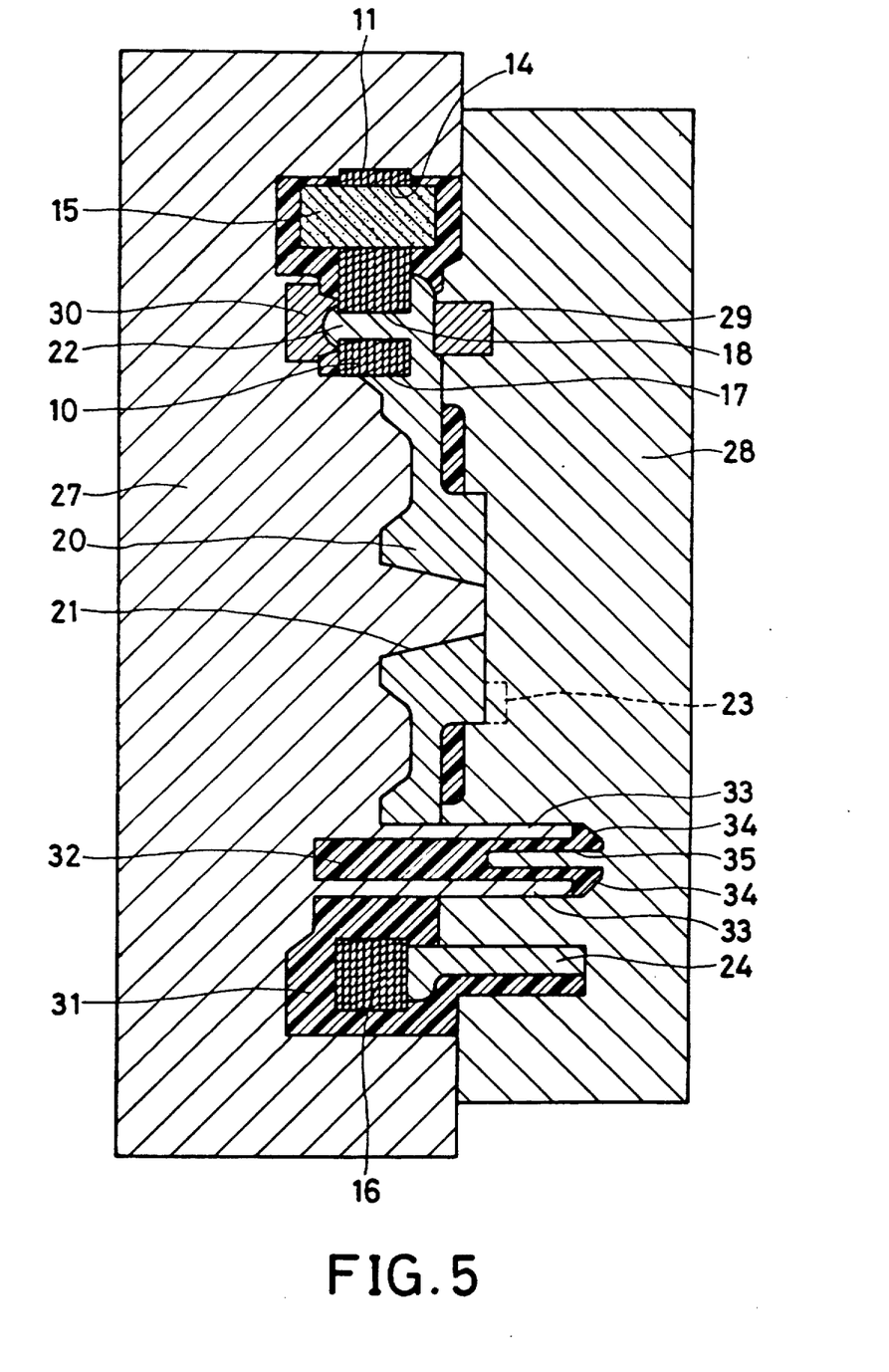
FIG. 5 is a cross section view of metal molds for molding a synthetic resin on the core shown in FIG. 3.

As shown in FIG. 2 to FIG. 4, a plurality of steel plates 10 is laminated together, and the magnet 15 is inserted into the holding portion 14. The steel plates or core 10 is connected to the boss 20, and the rivets 22 of the boss 20 are fitted into the small openings 18. Then, the assembly is situated inside metal molds 27, 28 (FIG. 5). Pieces 29 are mounted on the mold 28 for receiving the rivets 22, and pieces 30 are mounted on the opposite metal mold 27 for pressing top ends of the rivets 22. The pieces 29 and 30 are made of hard metal and high abrasion resistant characteristics.

Accordingly, when a pair of metal molds 27 and 28 is closed, rear sides of the rivets 22 are received by the pieces 29 and top ends of the rivets 22 are received by the pieces 30. When the molds 27, 28 are compressed, the plurality of laminated steel plates 10 are connected together and to the boss 20. Namely, the rivets 22 are fastened by closing the molds 27, 28.

Figure 6:
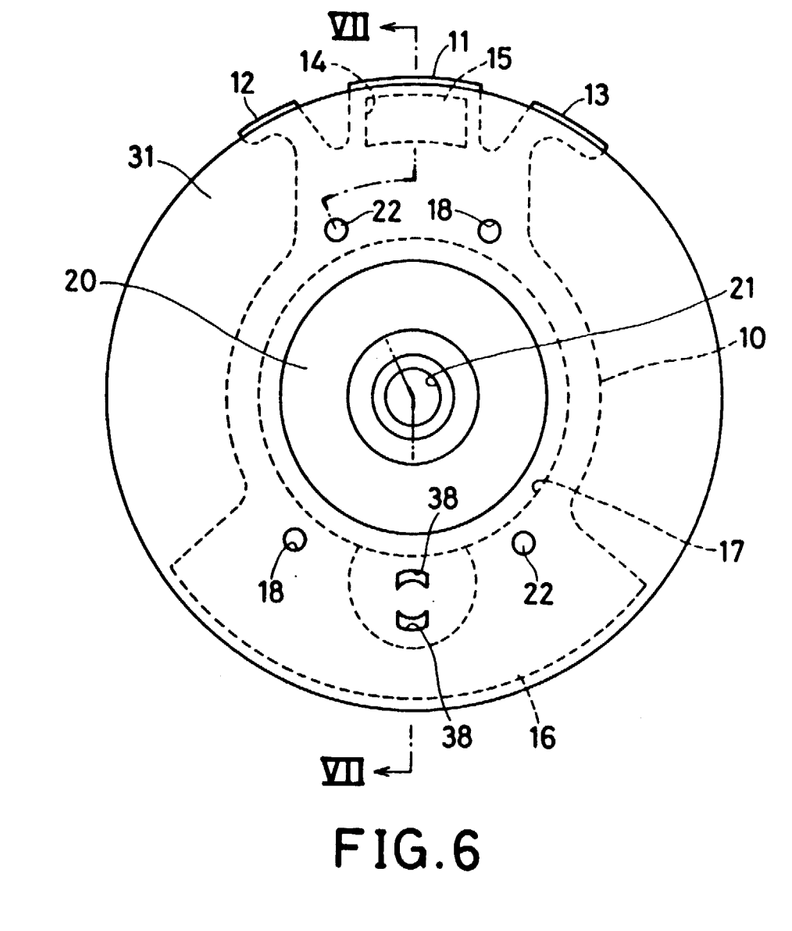
FIG. 6 is a front view of a molded synthetic resin rotor.
Figure 7:
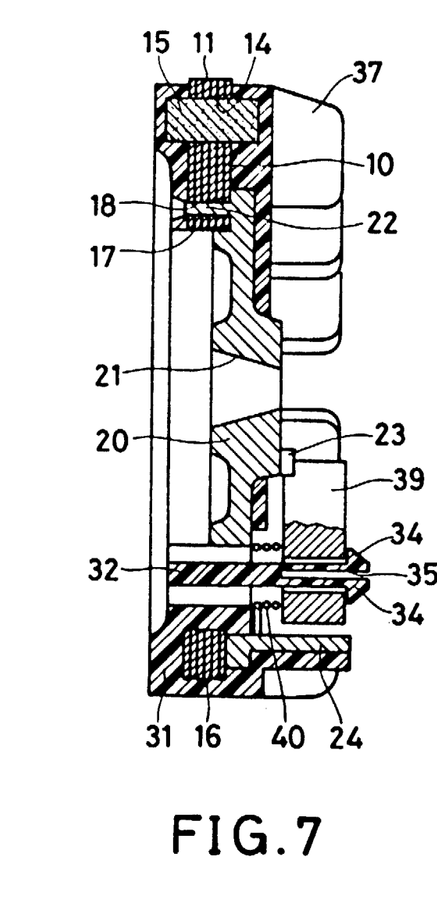
FIG. 7 is a cross section view along the line VII—VII in FIG. 6.
Figure 8:
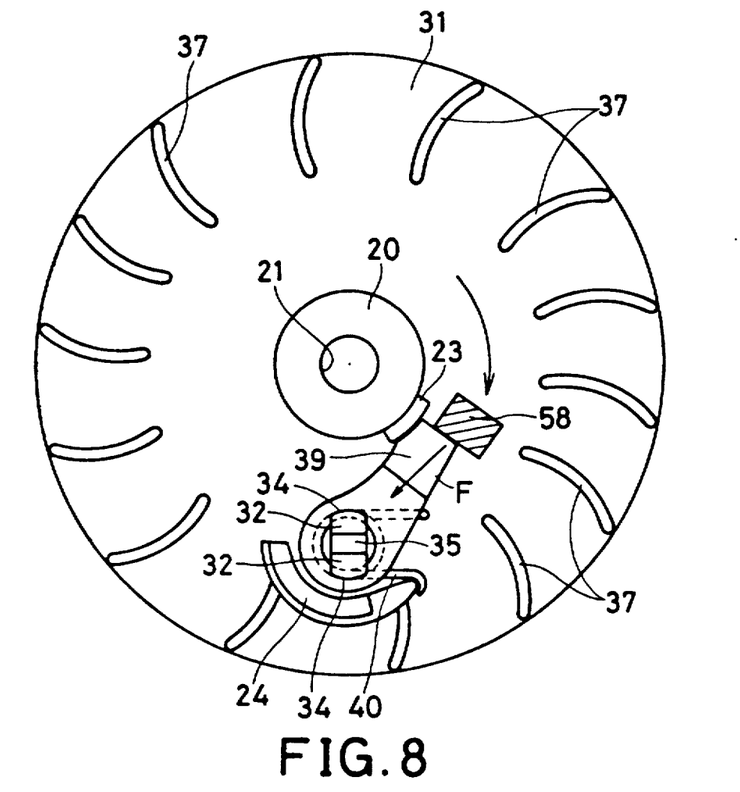
FIG. 8 is a rear view of the rotor shown in FIG. 6.

Then, a molten synthetic resin is poured into a cavity between the closed metal molds 27, 28, and a circular mold is made by the synthetic resin on the core 10 as shown in FIG. 6 to FIG. 8. That is, a peripheral portion of the rotor 31 is made by the molded resin. Further, a support shaft 32 is integrally mounted on the molded rotor when the rotor 31 is molded.

In FIG. 5, a pair of projections 33 extends from the metal mold 27 along the both lateral sides of the shaft 32. By the projections 33, a pair of under-cut portions 34 is integrally formed at the top end of the shaft 32 to extend radially outwardly from the shaft 32. Further, the shaft 32 is provided with a narrow groove 35 extending in axial direction.

Figure 9:
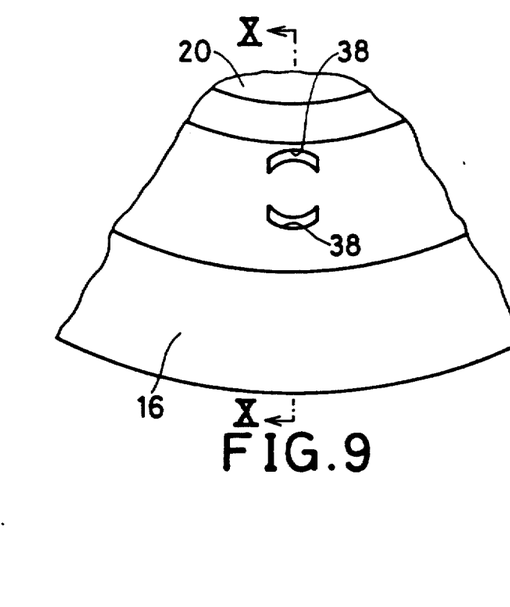
FIG. 9 is an enlarged rear view of a support portion of the rotor shown FIG. 8.
Figure 10:
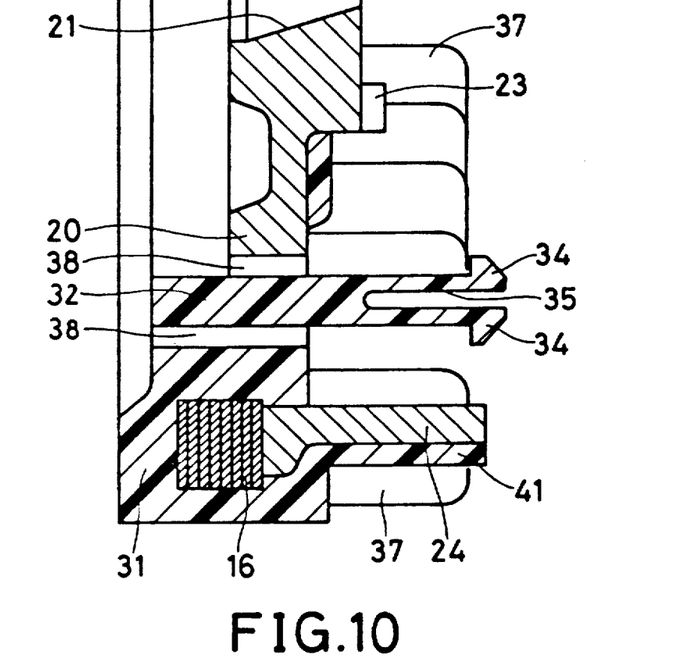
FIG. 10 is an enlarged cross section view along the line X—X in FIG. 9.

When the metal molds 27, 28 as shown in FIG. 5 are opened, a disc rotor is obtained as shown in FIG. 6 to FIG. 8. The periphery of the rotor 31 is made of the synthetic resin, and fins 37 are integrally formed on the rotor 31. Further, a pair of arc shaped through holes 38 is formed at the both lateral sides of the shaft 32, as shown in FIG. 9 and FIG. 10, by removing the projections 34, which are provided on the metal mold 27 for forming the under-cut projections 34 on the shaft 32.

The support shaft 32 beside the through holes 38 supports a pawl 39 with some spaces therebetween, as shown in FIG. 7 and FIG. 8. When the pawl 39 is engaged with the shaft 32, the pawl 39 is placed above the shaft 32 so that a hole of the pawl 39 is situated above the shaft 32, and the pawl 39 is pushed against the shaft 32. As a result, the top end of the shaft 32 deforms due to the groove 35, and the pawl 39 passes through the undercut portions 34 to engage the shaft 32.

Figure 11:
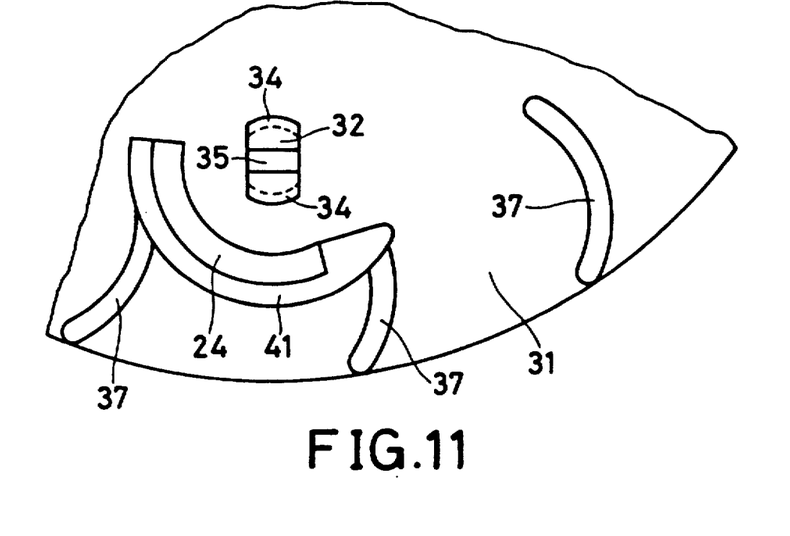
FIG. 11 is an enlarged front view of the support portion shown in FIG. 10.

A spring 40 is installed between the pawl 39 and the rotor 31. The spring 40 urges the pawl 39 to rotate around the shaft 32 in the counter clockwise direction in FIG. 8, so that the top free end of the pawl 39 contacts the stopper 23. On the peripheral side of the receiving projection 24 of the boss 20, a mold reinforcing portion 41 is formed as shown in FIG. 10 and FIG. 11.

Figure 12:
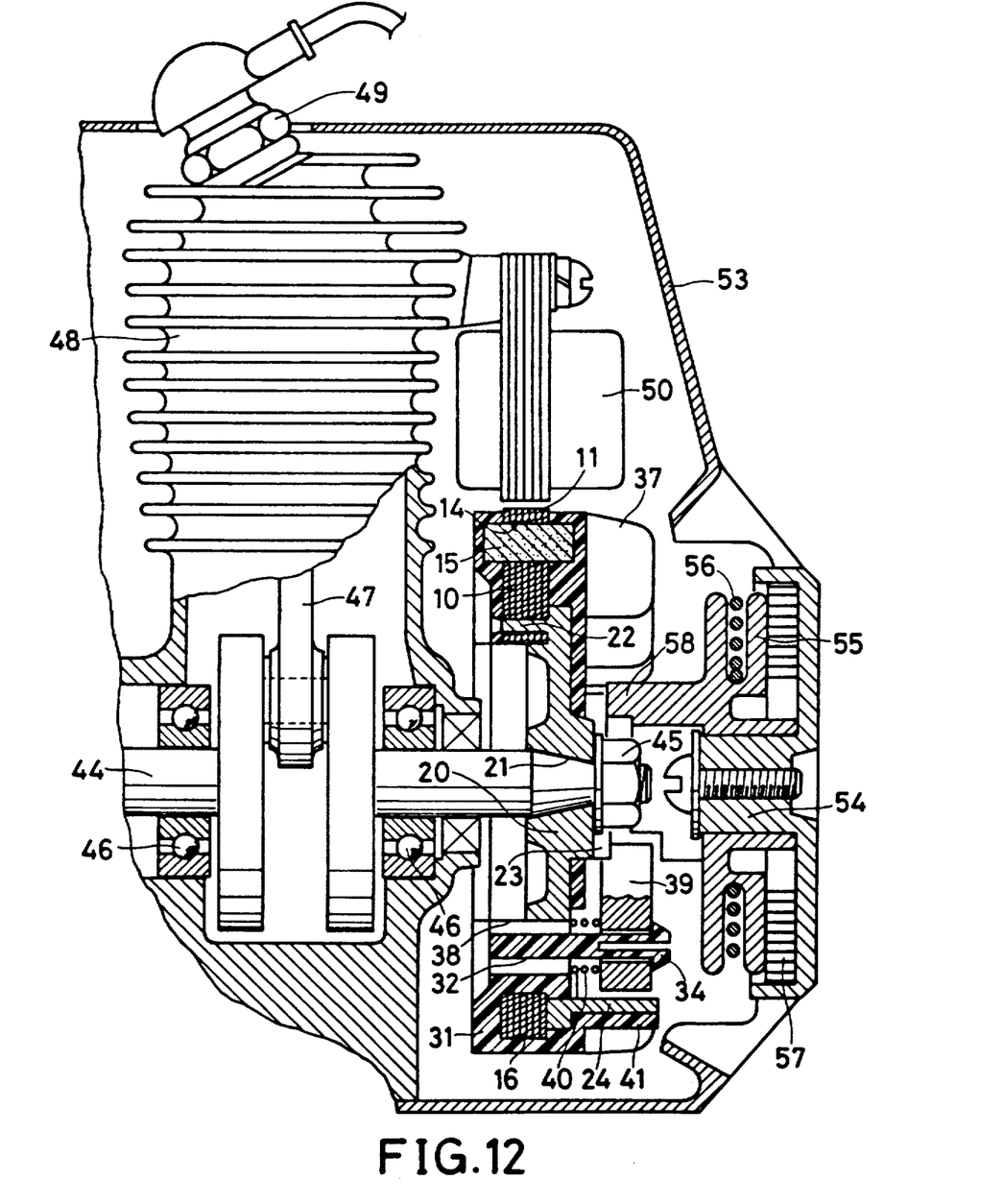
FIG. 12 is a cross section view of an essential portion of an engine, wherein the rotor is connected to a top end of a crank shaft.

The mold rotor 31 thus assembled is connected to a tapered top end of a crank shaft 44 of the engine as shown in FIG. 12. A conical opening defined in the center of the rotor is placed on the tapered top end of the crank shaft 44. The rotor 31 is fixed to the top end portion of the shaft 44 by a nut. The crank shaft 44 is rotatably supported by ball bearings 46, and the cranked portion of the shaft 44 is connected to a piston in a cylinder 48 through a connecting rod 47. An ignition plug 49 is provided at the top of the cylinder 48, and the plug 49 is electrically connected to a coil 50, which is arranged outside the rotor.

A support shaft 54 is integrally mounted on a casing 53 for receiving the rotor, and an axis of the shaft 54 is located to align with an axis of the crank shaft 44. The support shaft 54 rotationally supports a reel 55, on which a starter rope 56 is wound. Further, the reel 55 is urged by a spiral spring 57 so that the reel 55 rotates in such a direction that the reel 55 retracts the starter rope 56. The reel 55 has an engaging projection 58 which engages the top end of the pawl 39.

Next, an operation will be described. When the starter rope 56 is pulled by hand, the reel 55 rotates around the shaft 54 against the force of the spiral spring 57. Rotation of the reel 55 is transmitted to the top end of the pawl 39 through the engaging projection 58 of the reel 55. Since the pawl 39 is loosely supported on the shaft 32, in case the top end of the pawl 39 is pushed by the engaging projection 58, a rear end of the pawl 39 abuts against the receiving projection 24. Therefore, the rotor 31 rotates, because the rotor supports the pawl 39 by means of the shaft 32 and the receiving projection 24.

Force applied to the pawl 39 is substantially received by the receiving projection 24 and the molded reinforcing portion 41. Large force is not applied onto the supporting shaft 32. Therefore, rotation of the reel 55 results in the rotation of the crank shaft 44, because the rotor 31 is connected to the top end of the crank shaft 44. Rotation of the crank shaft 44 causes the cranking or starting of the engine.

By rotation of the rotor 31, magnetic flux from the magnet 15 supported by the core 10 of the rotor 31 intersects the coil 50, and the coil 50 generates electric power. The generated electric power is transformed to high voltage by a coil, and is supplied to the ignition plug 49. Hence, the plug 49 generates a spark in the cylinder 48 for igniting mixture of fuel and air, resulting in the start of the engine.

Rotation of the reel 55 is transmitted to the pawl 39 through the engaging projection 58, but rotation of the engine is not transmitted to the reel 55 through the pawl 39 when the engine voluntarily rotates after starting. Namely, the pawl 39 rotates clockwise around the shaft 32 in FIG. 8, and disengages from the engaging projection 58 of the reel, so that the rotation of the engine is not transmitted to the reel 55.

The rotational speed of the rotor becomes high, when the engine rotates fast. Since strong centrifugal force is applied to the pawl 39, the pawl 39 rotates clockwise around the support shaft 32 in FIG. 8 against the spring 40. Then, the free end of the pawl 39 turns to the peripheral direction and does not contact the engaging projection 58, resulting in prevention of discomfortable mechanical noise.

According to the above mentioned rotor of the starter, the support shaft 32 is integrally formed on the synthetic resin rotor 31 for rotatably supporting the pawl 39. Further, the support shaft 32 has the pair of under-cut portions 34 on the both lateral sides of the top end, and the narrow groove 35 formed on the shaft to permit deformation of the under-cut portions 34.

Accordingly, the pawl 39 can be easily installed on the rotor 31 by merely fitting the pawl 39 on the shaft 32 to permit the hole of the pawl 39 to pass over the under-cut portions 34. The under-cut portions 34 engage the pawl for preventing the pawl 39 from disengaging from the rotor. Therefore, it is not necessary to equip an engaging ring after the pawl 39 is installed. Accordingly, in the present invention, number of parts of the rotor is minimized, the structure of the rotor becomes simple, and the steps for manufacturing the rotor are reduced. The rotor can be supplied at a low cost.

Still further, according to the rotor of this embodiment, the deformation process of the rivets for connecting the laminated plates to the boss 10 is accomplished by closing movement of a pair of metal molds 27 and 28. That is, the pieces 29, 30 are respectively mounted on the molds 27 and 28. The rear sides of the rivets 22 receive the pieces 29, and the pieces 30 push the top of the rivets 22 for fastening the rivets 22.

Therefore, the core 10 connected to the boss 20 and having the magnet 15 is arranged in the metal molds 27, 28, and the molds 27, 28 are closed, so that the rivets are fastened. Accordingly, the riveting step is accomplished by utilizing the step of molding the synthetic resin onto the core 10. Thus, the manufacturing process can be minimized.

Figure 13:
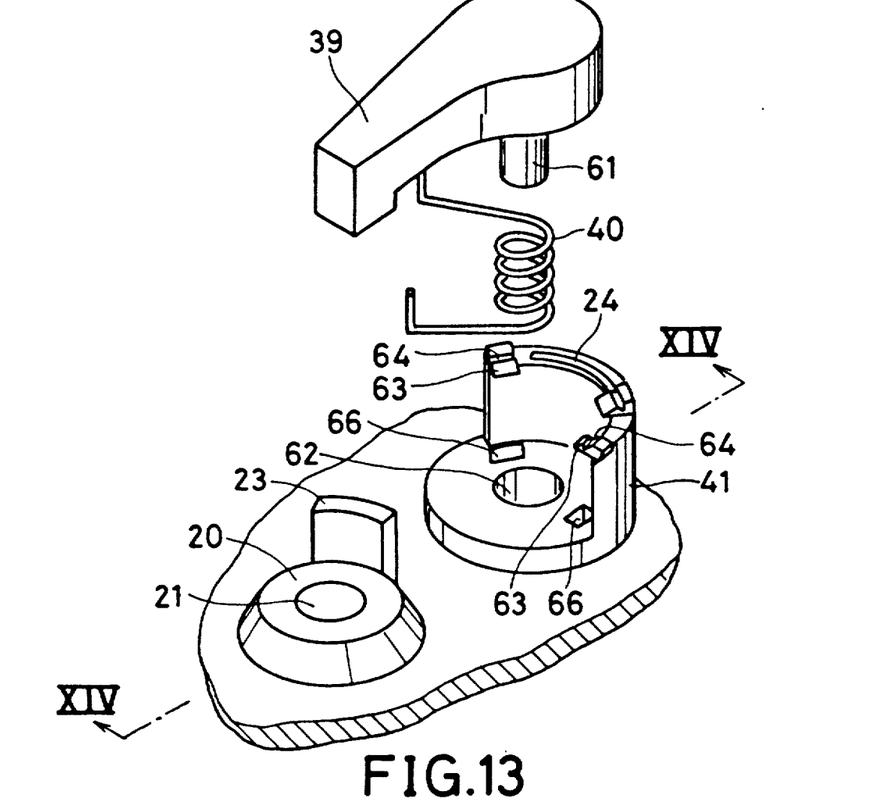
FIG. 13 is an exploded perspective view of a modification of the present invention.
Figure 14:
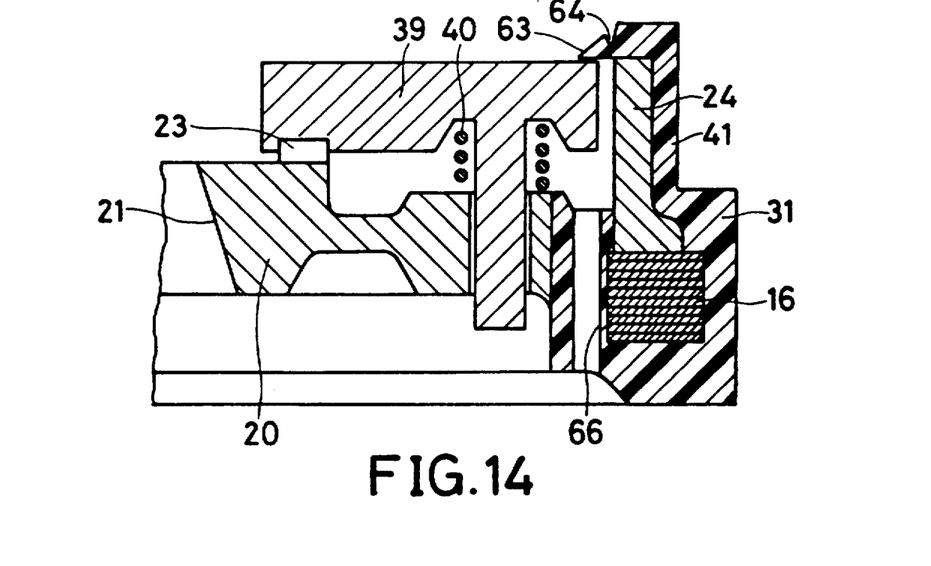
FIG. 14 is a cross section view along the line XIV—XIV in FIG. 13.

Next, a modification will be described with reference to FIG. 13 and FIG. 14. In this modification, a support shaft 61 is integrally formed on the pawl 39, and a through hole 62 is formed on the rotor for receiving the shaft 61. Further, stoppers 63 are formed on the mold reinforcing portion 41 formed behind the receiving portion 24 for receiving or holding a side wall of the pawl 39.

A slit 64 is formed at a part near a root of each stopper 63, so that the stopper 63 can bend. Through holes 66 are formed under the stopper 63, when projections of a metal mold are removed. The projections are formed on the metal mold for forming the under-cut stoppers 63.

According to the modification, the spring 40 is placed on the shaft 61 of the pawl 39 and the shaft 61 of the pawl 39 is fitted into the through hole 62, and then the base portion of the pawl 39 is pushed over the stopper by bending the stopper 63 of the rotor due to the slit 64. Thus, the pawl 39 is installed onto the rotor 31 as shown in FIG. 14.

In this connected condition, the pawl 39 is prevented from disengaging from the rotor by the stopper 63. The pawl 39 can be connected to the rotor 31 by merely fitting the shaft 61 of the pawl 39 into the through hole 62 of the rotor.

Figure 15:
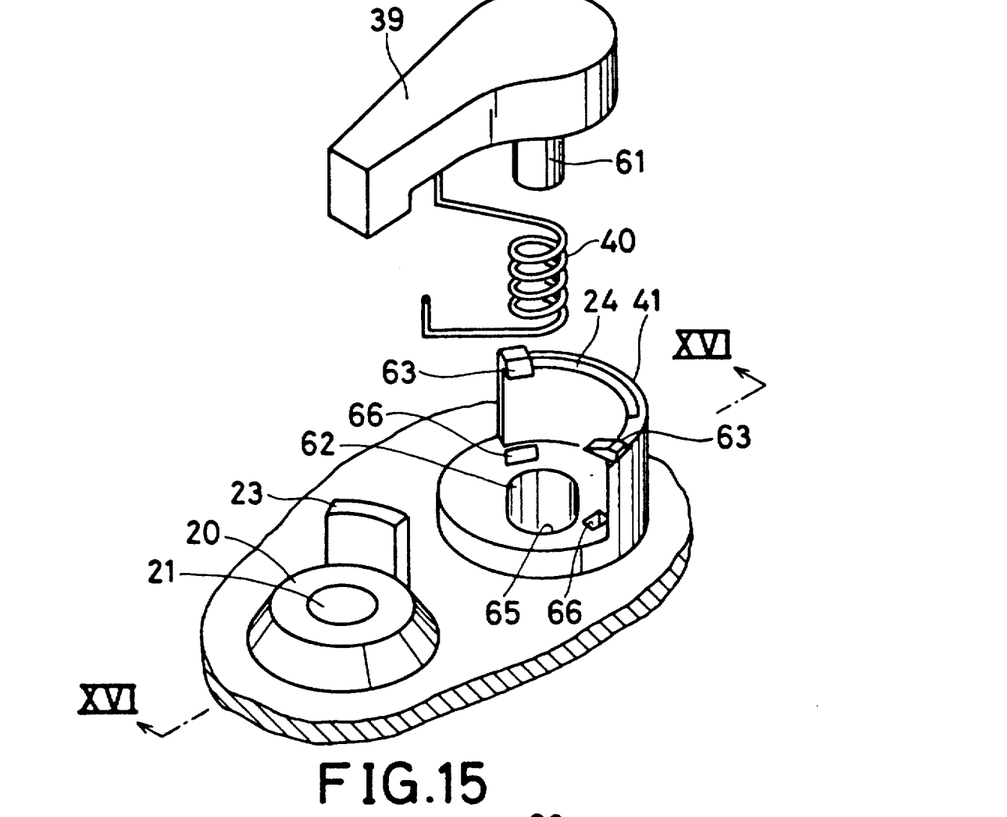
FIG. 15 is an exploded perspective view of a further modification of the present invention.
Figure 16:
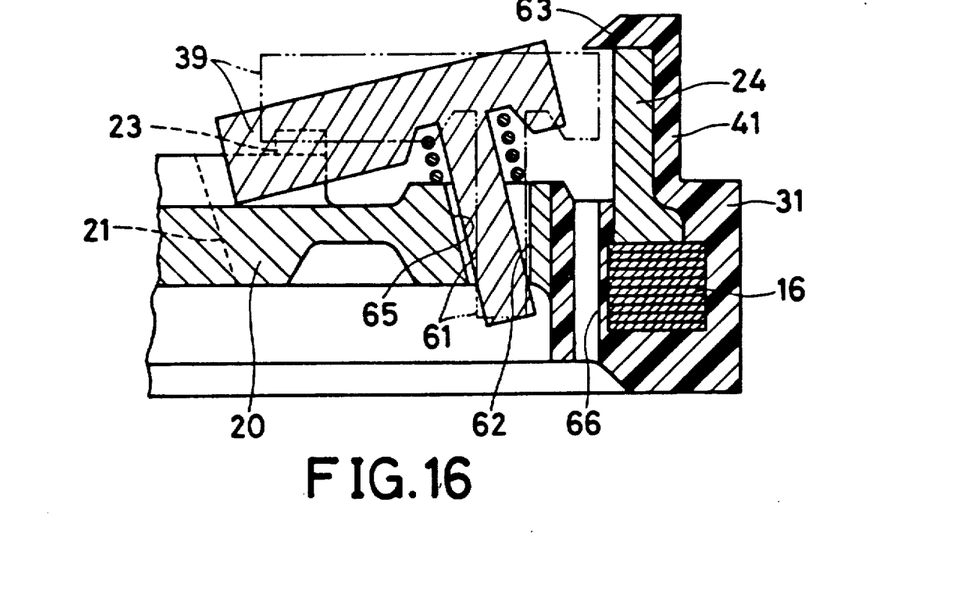
FIG. 16 is a cross section view along the line XVI—XVI in FIG. 15.

FIG. 15 and FIG. 16 show another modification. In this modification, an inclined or tapered groove 65 is formed on the through hole 62 at a predetermined angle in the radial direction. By the inclined groove 65, the size of the upper side of the through hole 62 becomes large.

By this arrangement, the shaft 61 of the pawl 39 is fitted into the through hole 62 by inclining the pawl 39, as shown in FIG. 16 by utilizing the inclined groove 65 of the rotor 31. After the shaft 61 is fitted into the through hole 62, the pawl 39 is moved to a vertical posture as shown in chain lines in FIG. 16. Then, the pawl 39 is upwardly pushed as shown in FIG. 16 by force of the spring 40 which is arranged around the shaft 61, and upper edge of the pawl 39 engages the stopper 63.

According to the modification, it is not necessary to form a slit 64 at a part near the root of the stopper 63. Still more, the pawl 39 can be easily removed from the rotor by turning the pawl 39 to such an angular position where the inclined groove 65 is formed. Maintenance is easy in this modification.

Figure 19:
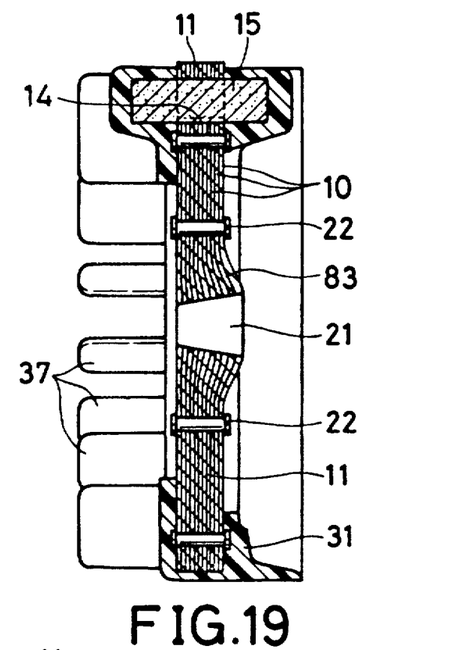
FIG. 19 is a cross section view along the line XIX—XIX in FIG. 18.

Next, a second embodiment of this invention will be described with reference to FIG. 17 to FIG. 20. The rotor of this embodiment includes a core, which is made of a plurality of magnetic steel plates 10 laminated with each other, as shown in FIG. 19. A holding portion 14 is formed at the upper side of the plate 10. The holding portion 14 is a rectangular opening, in which a magnet 15 is received. A magnetic pole 11 is formed at the upper side of the opening 14. Further, a pair of other magnetic poles 12 and 13 is formed as a left side projection 12 and a right side projection 13. Still further, a plurality of oblong openings 81 is formed for lightening the core 10, and a central circular opening 82 is formed at the center of the core.

Figure 20A:
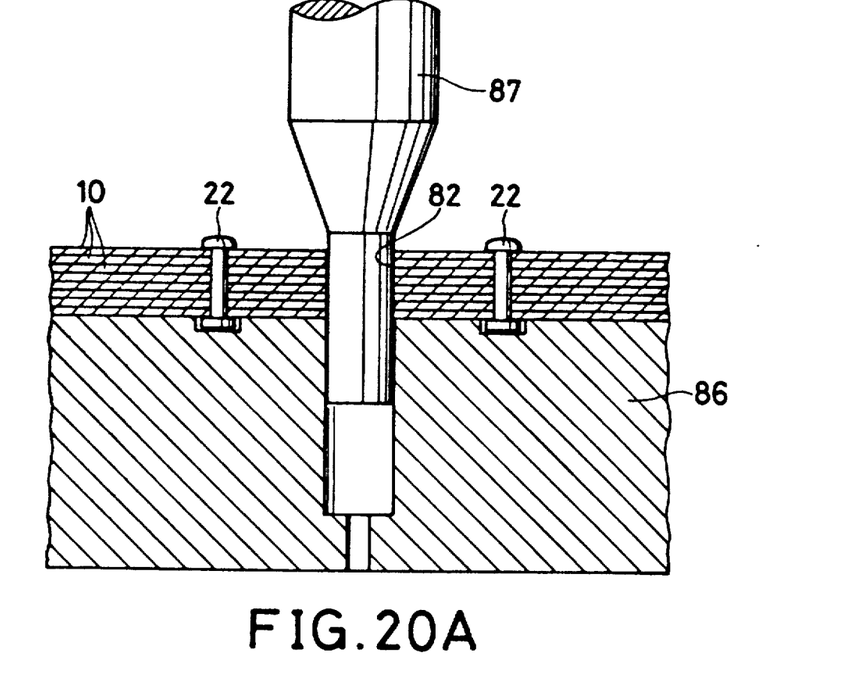
FIG. 20A and FIG. 20B are cross section views for showing essential portions of the cores when forming a conical opening on the core.
Figure 20B:
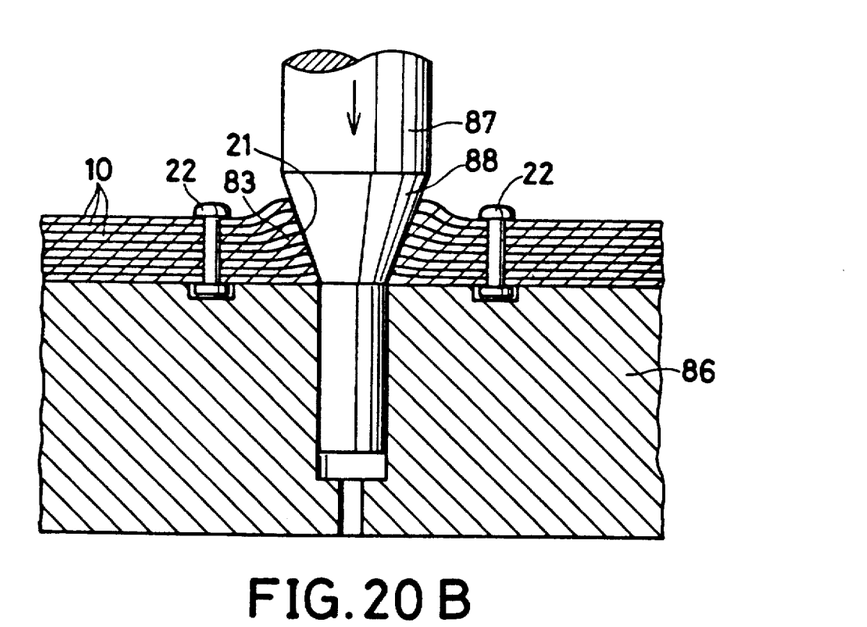

When the rotor is formed, the steel plates or core 10 are laminated with each other and are connected by rivets 22 before the magnet 15 is inserted into the opening 14. The laminated core 10 is placed on a base 86 as shown in FIG. 20A for receiving a punch 87 at a central opening 82 of the core 10. Then, the punch 87 is pushed and displaced downwardly for strongly fitting a tapered portion 88 of the punch 87 into the opening 82. By this movement, the center of the core 10 around the central opening 82 is deformed and a thickened portion 83 is formed at the center of the core 10, and the central opening 82 is changed to a conical opening 21, which is shown in FIG. 20B.

Figure 17:
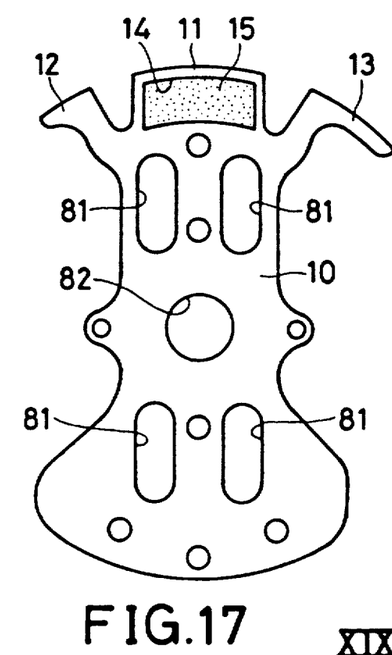
FIG. 17 is a front view of a core of a rotor according to a second embodiment of the invention.
Figure 18:
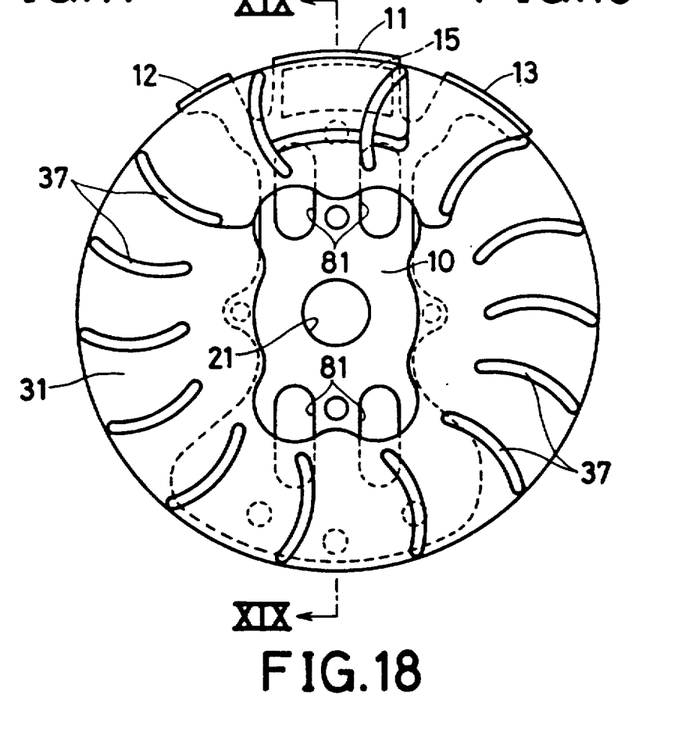
FIG. 18 is a front view of a molded synthetic resin rotor, wherein the resin is molded on the core shown in FIG. 17.

After the formation of the conical opening 21 and the thickened portion 83 from the straight central opening 82 by means of the punch 87, the magnet 15 is inserted into the opening 14 as shown in FIG. 17. Then, the core 10 is placed into metal molds for molding a synthetic resin on the peripheral portion of the core 10, resulting in a resin molded rotor 31 as shown in FIG. 1 and FIG. 19. A plurality of fins 37 is integrally molded on an end surface of the molded rotor. Thus, a molded rotor with a tapered central opening 21 is obtained.

According to the rotor, number of parts is reduced, and assembling process for connecting the boss to the core is eliminated, because the boss is not provided, resulting in the reduction of the cost of the rotor. Further, the conical central opening 21 has sufficient strength because the central opening 21 is formed by forging process through the punch 87. The strength may be substantially the same as that of an integral metal rotor.

When the central conical opening 21 is fitted with the tapered top end of the crank shaft and the rotor is connected to the crank shaft, the rotor is firmly fixed and is not rickety. Hence, the rotor is surely fixed on the top end of the crank shaft with high precision.

Figure 21:
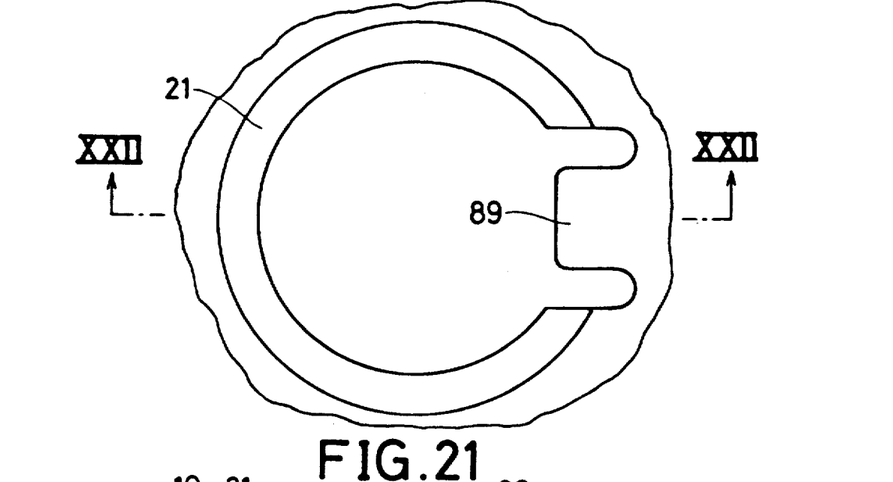
FIG. 21 is an enlarged plan view of a conical opening of the core according to the modification of the second embodiment.
Figure 22:
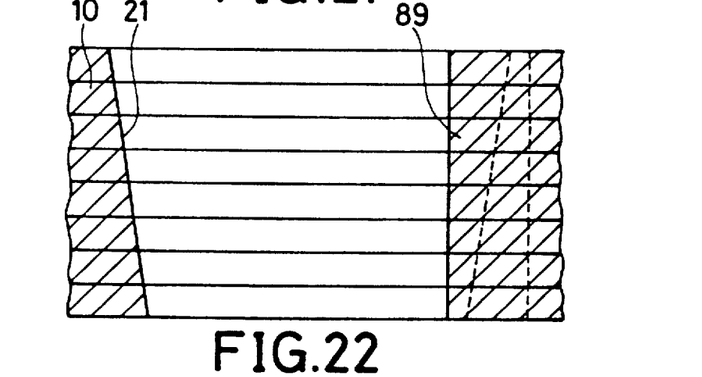
FIG. 22 is an enlarged cross section view along the line XXII—XXII in FIG. 21.
Figure 23:
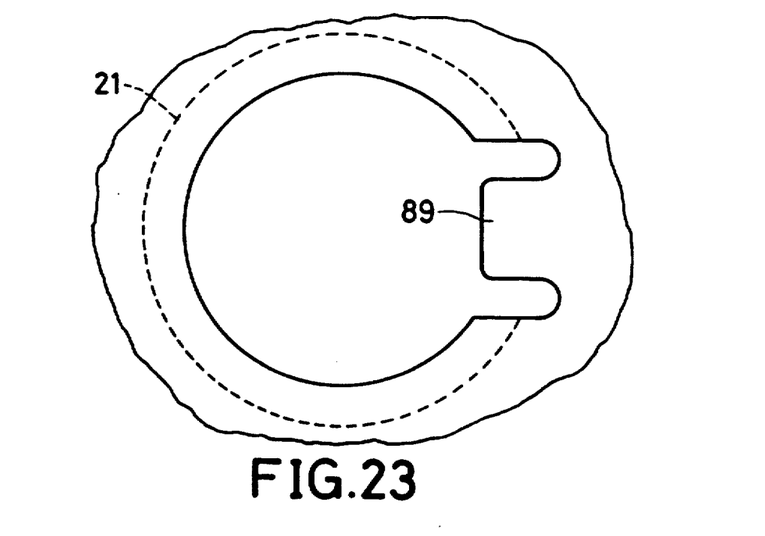
FIG. 23 is an enlarged bottom view of a conical opening of the core shown in FIG. 22.

FIG. 21 to FIG. 23 show a modified central opening 21 defined at the center of the rotor of the above mentioned second embodiment. In this modification, a key 89 is integrally formed on the internal peripheral surface of the conical opening 21 by using a specific punch, which is prepared for the formation of the conical opening 21. The key 89 engages a key way formed on the periphery of a top end of a crank shaft for preventing the rotor from attaching to the crank shaft angularly or slantingly. Therefore, by this arrangement, process for defining the key way on the internal surface of the opening 21 can be eliminated. Hence, the machining process becomes simple, and a specific key member made of a separate piece is not necessary For this reason, the cost of the rotor can be reduced.

Having described specific embodiments of this invention with reference to the accompanying drawings, it is to be understood that the invention is not limited to those precise embodiments, and that various changes and modifications may be made by one skilled in the art without departing from the scope or the spirit of the invention as described in the appended claims.

What is claimed is:

1. A rotor for a generator adapted to be ignited by rotating a reel, comprising:
    a rotor assembly including a magnet, a core formed of a plurality of laminated magnetic plates and having a hole to retain the magnet, and a synthetic resin molded outside the magnetic plates together with the magnet,
    a pawl rotationally attached onto the rotor assembly, said pawl being engageable with the reel when the reel is rotated,
    support means for rotationally supporting the pawl on the rotor assembly, said support means being attached to the rotor assembly and including a support shaft formed on one of the pawl and the rotor assembly, and a through hole formed on one of the rotor assembly and the pawl so that the support shaft engages the through hole, and
    a stopper attached to the rotor assembly, said stopper being integrally formed with the synthetic resin of the rotor assembly and engaging the pawl to prevent the pawl from disconnecting from the support means.

2. A rotor for a generator according to claim 1, wherein said rotor assembly further includes a reinforcing portion situated adjacent the pawl to extend outwardly from the rotor assembly, said stopper being formed at the reinforcing portion.

3. A rotor for a generator according to claim 2, wherein said stopper includes a deformable root adjacent the reinforcing portion so that when the pawl is attached to the rotor assembly, the stopper deforms to allow the pawl to engage the rotor assembly, and when the pawl is pulled out of the rotor assembly, the stopper prevents the pawl from disengaging from the rotor assembly.

4. A rotor for a generator according to claim 2, wherein said support shaft is integrally formed on the pawl, and said through hole is formed on the rotor assembly, said through hole having an inclined groove extending radially outwardly from the through hole so that depth decreases as distance from the through hole increases, said support shaft on the pawl being inserted into the through hole through the inclined groove without being preventing by the stopper when assembled.

5. A rotor for a generator according to claim 4, further comprising a spring situated around the support shaft to urge the pawl upwardly so that the pawl does not accidentally disengage from the rotor assembly.

6. A rotor for a generator, comprising:
    a rotor assembly including a magnet, a core formed of a plurality of laminated magnetic plates and having a hole to retain the magnet, and a synthetic resin molded outside the magnetic plates together with the magnet,
    a conical opening formed at a center of the core made of the laminated magnetic plates, said conical opening being formed by pushing a tapered punch into the center of the core, and
    a thickened portion integrally formed with the core made of the laminated magnetic plates around the conical opening to strengthen the center of the core, said thickened portion being formed at the same time of forming the conical opening.

7. A rotor for a generator adapted to be ignited by rotating a reel, comprising:
    a rotor assembly including a magnet, a core formed of a plurality of laminated magnetic plates and having a hole to retain the magnet, and a synthetic resin molded outside the magnetic plates together with the magnet,
    a pawl rotationally attached onto the rotor assembly, said pawl being engageable with the reel when the reel is rotated, support means for rotationally supporting the pawl on the rotor assembly, said support means including a support shaft integrally molded with the synthetic resin of the rotor assembly, said support shaft having a groove to divide the shaft at a front end thereof, and a stopper integrally formed at the front end of the shaft to extend radially outwardly therefrom, said stopper engaging the pawl to prevent the pawl from disengaging from the support means.

8. A rotor for a generator adapted to be ignited by rotating a reel, comprising:

a rotor assembly including a magnet, a core formed of a plurality of laminated magnetic plates and having a hole to retain the magnet, and a synthetic resin molded outside the magnetic plates together with the magnet, a pawl rotationally attached onto the rotor assembly, said pawl being engageable with the reel when the reel is rotated, support means for rotationally supporting the pawl on the rotor assembly, said support means being attached to the rotor assembly, a stopper attached to the rotor assembly, said stopper engaging the pawl to prevent the pawl from disconnecting from the support means, and a receiving projection formed on the rotor assembly and situated adjacent to the pawl so that when the reel engages the pawl for rotating the rotor, the pawl is pushed against the receiving projection on the rotor assembly to thereby support the pawl.

* * * * *